United States Patent [19]

Surovikin et al.

[11] 4,101,639

[45] Jul. 18, 1978

[54] PROCESS FOR PRODUCTION OF CARBON BLACK

[76] Inventors: Vitaly Fedorovich Surovikin, ulitsa Lermontova, 20, kv. 80; Gennady Vasilievich Sazhin, ulitsa 50 let VLKSM, 8, kv. 33; Mikhail Ivanovich Romanov, ulitsa 3 Molodezhnaya, 56, kv. 34; Nikolai Kalistratovich Korenyak, Kamerny pereulok, 52, kv. 39, all of Omsk, U.S.S.R.

[21] Appl. No.: 698,911

[22] Filed: Jun. 23, 1976

[30] Foreign Application Priority Data

Jun. 30, 1975 [SU] U.S.S.R. .................. 2150406

[51] Int. Cl.$^2$ .................. C01B 31/02; C09C 1/48
[52] U.S. Cl. .................. 423/449; 423/450; 423/456; 23/259.5
[58] Field of Search .............. 423/449, 450, 453, 456, 423/461, 455; 23/259.5

[56] References Cited

U.S. PATENT DOCUMENTS

| | | | |
|---|---|---|---|
| 2,617,714 | 11/1952 | Arnold | 423/450 |
| 3,009,783 | 11/1961 | Sheer et al. | 423/450 |
| 3,331,664 | 7/1967 | Jordan | 423/449 |
| 3,409,403 | 11/1968 | Bjornson et al. | 423/450 |
| 3,431,074 | 3/1969 | Jordan | 423/450 |
| 3,832,450 | 8/1974 | Wiggins | 423/450 |

FOREIGN PATENT DOCUMENTS

3,816,109  8/1963  Japan .................. 423/450

*Primary Examiner*—Earl C. Thomas
*Assistant Examiner*—Gregory A. Heller
*Attorney, Agent, or Firm*—Lackenbach, Lilling & Siegel

[57] ABSTRACT

Water vapor is injected into a gaseous heat carrier passing into a reaction chamber as a plasma stream, contacting a hydrocarbon feed stock there is injected water vapor, and introduced presaturated with water vapor. Under the effect of the heat carrier temperature, the feedstock is decomposed to carbon black which, after being quenched, is collected, for example, by cyclones.

The proposed process makes it possible to decrease the degree of polydispersion of the carbon black obtained and also to produce carbon black with a specific geometrical surface within the range of from 50 m$^2$/g to 250 m$^2$/g, without altering the construction of the reaction chamber.

The proposed process avoids the formation of laminated structures, pyrolytic carbon and graphite in the carbon black, which improves the quality of rubber based on these carbon blacks insofar as their abrasive resistance and tensile strength are concerned. Besides, the proces makes it possible to conduct the carbon black-forming reaction within 10$^{-2}$ to 10$^{-4}$ seconds.

3 Claims, 1 Drawing Figure

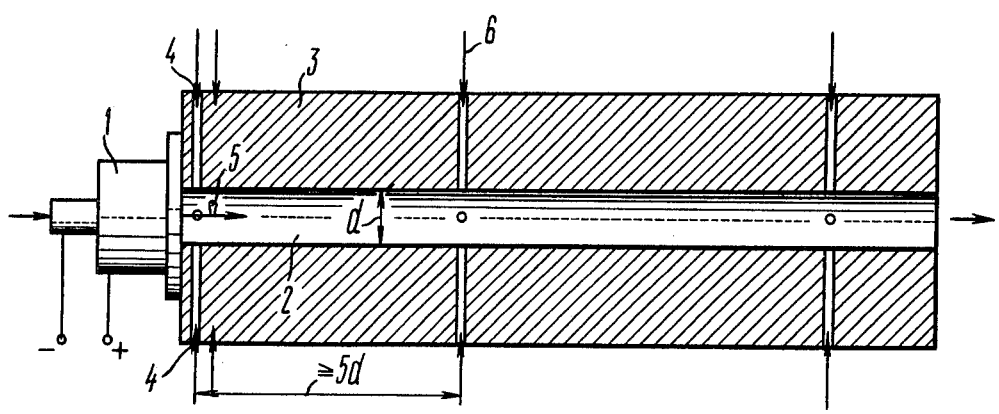

PROCESS FOR PRODUCTION OF CARBON BLACK

The present invention relates to methods of producing carbon black and may be used for the production of various types of carbon black as well as for the production of technical grades of hydrogen obtained as a gaseous by-product.

This invention will find application in manufacturing tires and various rubber articles, in the polygraphy, electronics and cable manufacturing industry, in the production of varnishes and paints, including areas in which reinforcing and pigmentary properties of carbon black are required.

Known in the art is the "furnace carbon black producing process", wherein air and hydrocarbon fuel are introduced into the combustion chamber of the reactor. The burning of the fuel is accompanied by the formation of combustion products having a temperature ranging from about 1500° to 1600° C. Injected into the products of combustion is air-atomized hydrocarbon stock. A part of the feedstock is burned, while the rest is decomposed to carbon black. The reaction products are quenched to a temperature of 700° C and the carbon black collected by any conventional method. The process described above is not efficient. The carbon black yield does not exceed 60%.

Plasma chemical carbon black producing processes employed at present make it possible to substantially increase the degree of feedstock decomposition to carbon black (to achieve a carbon black yield as high as 97%).

Also known is a process of producing carbon black, which comprises introduction of hydrocarbon feedstock into the reaction chamber, wherein a high intensity arc stabilized by an inert gas is maintained. Under the effect of the high temperature produced by the arc, the feedstock is decomposed to carbon (carbon-black) and gaseous by-products. The decomposition products are then quenched to a temperature of 700° C and carbon black is recovered by any conventional means (cf. U.S. Pat. No. 3,420,632).

There is further known a carbon black producing process, employing plasma according to which hydrocarbon feedstock is introduced into the reaction chamber wherein plasma-heated nitrogen is introduced, the feedstock is decomposed at a high temperature to carbon black, the reaction products are then quenched to a temperature ranging between from 700° to 800° C, and carbon black is recovered by any conventional means (cf. U.S. Pat. No. 3,288,696; 1966).

In yet another known carbon black producing process wherein hydrocarbon feedstock is introduced into a plasma stream at a temperature of 9,000° K to be decomposed to acetylene, the reaction products are then treated for an effective length of time in a zone with a temperature of about 900° C until they are decomposed to carbon (carbon black) and hydrogen, the mixture is then quenched to a temperature within the range of from 300° to 700° C and carbon black is recovered by any conventional means (cf. U.S. Pat. No. 3,409,403).

There is also a process of producing carbon black, according to which hydrocarbon gases (vapors or liquid) are introduced into a plasmatron as the feedstock and as an arc-stabilizer. The gases (vapors) are heated within the plasma stream to a temperature of over 5,000° K and decomposed to carbon and hydrogen. As the plasma-forming gas, off-gases of the reaction can be used after being separated from carbon black. In this case, the hydrocarbon feedstock (gas and liquid) is fed to the channel wherein the plasma stream is burning.

The disadvantage of the above-mentioned processes is that the carbon black obtained thereby is non-uniform as to the size of its particles due to the inevitable sharp drop in temperature, the gradient being from the axis to the periphery in the area wherein the feedstock is introduced. Besides, carbon black produced by these processes has a substantial roughness coefficient value and includes lamellar and graphite contaminants, which impairs the quality of rubber; when this type of carbon black is blended with natural rubber, the resultant rubber begins to burn and its abrasion and tear strengths are impaired. Due to the inevitable presence in the carbon black of the non-decomposed products of reaction as mentioned above the thermal energy on the periphery of the reaction zone is not sufficient to provide for complete decomposition of the feedstock, the scope of its application is limited only to the production of dyes. The fact that xenon, argon, hydrogen, nitrogen and other noble gases are used in these processes as the plasma-forming gases makes them impractical on an industrial scale due to the carbon black production cost being excessively high.

It is an object of the present invention to obviate the above disadvantages.

The principal object of the invention is to provide a simplified process of producing carbon black with improved chemical and physical properties.

In accordance with the present invention, a hydrocarbon feedstock is decomposed to carbon black in a reaction chamber wherein a gaseous heat carrier is passed therein in the form of a plasma stream at a temperature of 2000° to 5000° K. More particularly, the present invention relates to feeding water vapor into the plasma stream radially and tangentially with respect to the walls of the reaction chamber, introducing the feedstock into the reaction chamber and into the plasma stream saturated with water vapor; cooling the reaction products resulting from the thermal decomposition of the feedstock, to a temperature of 200° to 700° C, and collecting the product.

The proposed carbon black producing process permits decreasing the degree of carbon black polydispersion, i.e., the ratio of the mean surface diameter of particles (dms) to the arithmetic mean diameter (dar) is 1.12:1.15, and also to obtain carbon black with a specific geometrical surface ranging from 50 $m^2/g$ to 250 $m^2/g$ without altering the structure of the reactor. The herein disclosed carbon black produced completely avoids the formation of lamellar structures, pyrolytic carbon and graphite in the carbon black, which improves the quality of rubber based on these carbon blacks, insofar as their abrasive resistance and tear strength are concerned.

Besides, the proposed process makes it possible to conduct the carbon black-forming reaction within $10^{-2}$ to $10^{-4}$ seconds.

It is preferable that water vapor be introduced into the plasma stream radially and tangentially in relation to the walls of the reaction chamber in ratio of 3:1, respectively.

The proposed process has made it possible to adjust polydispersion of the produced carbon black, irrespective of its specific surface, e.g. carbon black with a specific surface of 100 m²/g at different vapor feed ratios features a relationship $d_{ms}/d_{ar}$ equal to 1.12–1.21. By introducing water vapor into the plasma stream by radial and tangential streams in a ratio less than 3:1, the degree of the carbon black polydispersion is increased. Besides, the above-mentioned radial and tangential stream ratio has made it possible to speed up the formation of carbon black and to completely eliminate forced cooling of the reaction chamber walls at the point of introduction of the plasma stream.

It is advantageous, according to the invention, that the hydrocarbon feedstock be introduced into the reaction chamber, into the plasma stream mixed with water vapor, at a distance not less than 5 diameters of the reaction chamber from the point of introduction of water vapor into the plasma stream.

It has been found that the introduction of the feedstock into the plasma stream mixed with water vapor at the above-mentioned point is optimum, since the optical density of the carbon black gasoline extract constitutes 0.0015. When the above-mentioned distance is reduced to less than 5 diameters, the optical density of the carbon black gasoline extract increases, e.g. on introducing the feedstock into the plasma stream at a distance of 3.5 diameters from the point of saturation of the latter with water vapor, the carbon black yield is reduced to 71% (the optical density is 0.7). When this distance is more than 5 diameters, the thermal efficiency of the process is reduced.

To produce carbon black of the channel type with oxygen-containing groupings on the surface of its particles hydrocarbon feedstock, premixed with water vapor is used.

To enhance the heat and mass transfer process and make the best use of the plasma stream enthalpy, it is preferable, according to the invention, that vapor saturation of the plasma stream be effected by direct introduction of water vapor into the plasma stream.

For a more complete understanding of other objects and advantages of this invention, given below is a detailed description of the carbon black producing process with reference to examples and the accompanying drawing which is a schematic longitudinal cross-section view of the reactor wherein the proposed process can be conducted.

The herein-disclosed carbon black producing process is based upon decomposition of a hydrocarbon feedstock to carbon black in the reaction chamber under the effect of the temperature of the plasma stream mixed with water vapor entering the reaction chamber as a plasma stream.

Used as the heat carrier in the form of the plasma stream are gases such as argon, xenon, hydrogen, air, hydrocarbon gases, off-gases of the carbon black production, separated from carbon black, or mixtures thereof.

With reference to the accompanying drawing gases are directed into the arc chamber of a plasmatron I operating on direct or alternating current, wherein the gases are heated due to the Joule heat of the arc.

Heated in the plasmatron I, the gas with a mean mass temperature ranging from about 2,000° to 5,000° K, passes into a reaction chamber 2 of a plasam-chemical reactor 3 at an average speed of 200 to 450 m/sec. The gas flow rate is varied so that it would be possible to maintain the mean mass temperature of the plasma stream, required for the production cycle, and its average speed across reaction chamber 2, with regard to stable operation of the plasmatron.

Into the reaction chamber 2, wherein passes the heat carrier in the form of a plasma stream, introduced along channels 4 and 5 of the vapor assembly is water vapor by radial and tangential streams in relation to the walls of the reaction chamber 2. The feed rate of the water vapor introduced by radial streams should be sufficient to promote a high rate of turbulent mixing of the water vapor with the plasma stream.

Water vapor is fed by tangential streams at a rate high enough to create a reliable vapor layer protecting the walls of the reaction chamber 2 from high temperatures of the plasma stream.

When hydrocarbon gases are used as the heat carrier to form the plasma stream, the water vapor introduced into the reaction chamber 2 along the channels 5 prevents deposition of condensed carbon on the walls of the chamber 2.

It has been found that water vapor streams should preferably be introduced into the plasma stream radially and tangentially in relation to the walls of the reaction chamber 2 in a ratio of 3:1, respectively. Variation in this ratio has made it possible to control the polydispersion of the produced carbon irrespective of its specific surface. For example, carbon black with a specific surface of 100m²/g at a different vapor feed rate ratio features a relation ship of $d_{ms}/d_{ar}$ equal to 1.12–1.21. The introduction of water vapor into the plasma stream radially and tangentially in a ratio less than 3:1, increases the polydispersion of carbon black.

It has also been found that water vapor should preferably be introduced directly into the plasma stream of the heat carrier, i.e. water vapor is to be introduced into the plasma stream at the point of its release from the plasmatron I. Water vapor may be introduced into the plasma stream at any point of the reaction chamber 2, however, within the limits of the introduction point of the hydrocarbon feedstock into the reaction chamber 2. On introducing water vapor directly into the plasma stream the heat and mass transfer rate is accelerated and enthalpy of the plasma stream is fully utilized.

Water vapor promotes the carbon black forming process, completely avoiding the possibility of formation of lamellar structures, pyrolytic carbon and graphite. Even a small amount of water vapor introduced into the plasma stream, sharply reduces the number of said formations, while the optimum quantity of water vapor used in any given process entirely frees them from the pyrolytic carbon, graphite and lamellar structure formations. Besides, the variation of relation ship $Q_{H_2O}/Q_{hc}$ where $Q_{H_2O}$ is the flow rate of water vapor; $Q_{hc}$ is the flow rate of the heat carrier gas, makes it possible to adjust the degree of carbon black polydispersion, irrespective of its specific surface. Thus, on obtaining carbon black with a specific geometric surface of 140 m²/g, and on increasing the value of the relationship of $Q_{H_2O}/Q_{hc}$ from 0.32 to 1.0 (parts by volume), the relationship $d_{ms}/d_{ar}$ decreases from 1.27 to 1.12.

After water vapor has been introduced into the plasma stream and the resultant mixture has been evenly distributed as to its concentration and temperature across the reaction chamber 2, the hydrocarbon feedstock is then introduced along a channel 6 through an injecting nozzle.

It is considered advantageous that the introduction of the hydrocarbon feedstock into the plasma stream mixed with water vapor should be effected at a distance of not less than 5 diameters of the reaction chamber from the point of introduction of the water vapor into the plasma stream.

The reduction of the distance between the point of introduction point of the water vapor and the hydrocarbon feedstock into reaction chamber 2 (less than 5 diameters) leads to conditions under which the hydrocarbon feedstock would be introduced into the plasma stream mixed with water vapor without having achieved uniformity in temperature and concentration of water vapor, as well as that of speed across the reaction chamber 2, which adversely affects the carbon black producing process, as will be demonstrated below.

To increase the above-mentioned distance (over 5 diameters) is not advantageous since, according to experimental data the plasma stream saturated with water vapor and ready to enter into the reaction, would suffer substantial enthalpy losses through the walls of the reaction chamber 2, which would lower the thermal efficiency of the process.

We contemplate a possibility of spacing the points of introduction of the hydrocarbon feedstock into the plasma stream and that of water vapor introduction more than 5 diameters apart, although it would entail certain thermal energy and economic losses. Thus, to obtain carbon black with a specific geometrical surface of 350 m$^2$/g, it is necessary to accelerate the plasma stream saturated with water vapor so that its velocity would exceed that of the heat carrier at the initial stage of the reaction chamber 2, wherein complete mixing of the plasma stream with water vapor takes place.

For the speed of the plasma stream saturated with water vapor to become as high as 320 m/sec, the distance between the points of introduction of the hydrocarbon feedstock and that of water vapor is increased up to 7.5 diameters of the reaction chamber 2. The specific geometrical surface of the carbon black produced under the conditions described above constitutes 200 m$^2$/g. It should be pointed out that the distance between the points of introduction of the hydrocarbon feedstock and that of water vapor being 5 diameters of the reaction chamber and the a speed of the plasma stream being 250 m/sec, the carbon black obtained has a specific surface of 170 m$^2$/g. The temperature of the plasma stream, saturated with water vapor in the examples given above, was the same. The thermal efficiency of the process in the first case was reduced by 7%.

Used as the hydrocarbon feedstock are gaseous compounds containing up to four hydrocarbon atoms: methane, ethane, propane, butane, as well as liquid compounds with a higher number of hydrocarbon atoms in a feedstock molecule.

It is recommended to use hydrocarbons of coal or coke origin, heavy oil refinery fractions and mixtures thereof, with a correlation index of from 90 to 130, and such hydrocarbons as, for example, benzene, toluene, and paraffins.

The herein-disclosed process permits obtaining high quality carbon blacks using feedstocks normally employed at present in the traditional furnace carbon black producing process.

Such hydrocarbon feedstocks are thermal cracking gas oil, green oil, anthracene oil, pitch distillates, furfurol extracts of thermal cracking, catalytic gas oils. All the above-named types of hydrocarbon feedstock do not affect the yield of the carbon black produced according to this invention, but only determine the process efficiency. At the same time, the chemical and physical properties of carbon blacks are affected by the type of feedstock used in the process. For example, the hydrocarbon feedstock used in similar processes with a correlation index of 100, permits obtaining carbon black with a specific geometrical surface of about 110 m$^2$/g, and using hydrocarbon feedstock with a correlation index of 120, a specific geometrical surface of the carbon black obtained will be 140 m$^2$/g. Besides, the type of hydrocarbon feedstock used affects polydispersion of the carbon black. Thus, for example, in the first instance given above, the relationship $d_{ms}/d_{ar} = 1.17$, while in the second instance this relationship equals 1.15.

It is most preferable to use aromatic feedstocks (those with a high correlation index). Thus, in the production of carbon black of the same quality from hydrocarbon feedstock with a different correlation index, the power consumption is less in the process employing hydrocarbon feedstock with a higher correlation index. For example, to obtain a carbon black with a specific geometrical surface of 160 m$^2$/g, feedstock with a correlation index of 100 and 120 should be used. In the first instance, power consumption constituted nearly 5 kwh per kg of feedstock, while in the second instance it was reduced to 4-4.2 kwh per kg of feedstock.

It has been found that to obtain carbon black with a higher content of oxygen-containing groups on its surface, it is preferable that the hydrocarbon feedstock be premixed with water vapor prior to its introduction into the plasma stream saturated with water vapor.

An increase in the content of oxygen-containing groups (quinone, lactone, carboxyls) on the carbon black surface is probably due to the fact that at the initial stage of intensive carbon black-forming process, water vapor, being a part of the feedstock begins to dissociate directly on the surface of carbon black. Active centers on the surface of carbon black promote oxygen bonds in the form of quinone, lactone or carboxyl groups. For example, where the carbon black producing process was conducted without water vapor in the hydrocarbon feedstock, the number of quinone groups on the carbon black surface was estimated at 0.300 m.equiv/g, those of lactone 0.110 m.equiv/g, and conversely where the hydrocarbon feedstock was premixed with water vapor in ratio 10:3, the number of quinone groups constituted 1.27 m.equiv/g, and those of lactone, 0.36 m.equiv/g.

Therefore, the hydrocarbon feedstock prepared as described above is introduced into the heat carrier passing into the reaction chamber 2 from the plasmatron 1. Under the effect of the high temperature plasma stream mixed with water vapor, the feedstock is thermally decomposed into carbon (carbon black) and gaseous by-products, the main component of which is hydrogen. After appropriate purification, this hydrogen may be utilized as an end product in chemical industry, specifically for the production of ammonia and nitrogen fertilizers.

After the reaction of the hydrocarbon feedstock decomposition is over at a temperature within the range of from 1,000° to 1,500° C produced by the heat carrier saturated with water vapor, the reaction mixture is quenched by introducing cooling agents thereinto (water or steam, or hydrocarbon low-boiling liquids). The moment of quenching and its rate are calculated by the known formulae. If, however, quenching is effected before the reaction of decomposition is completed, this will not only reduce the yield of the end product, but will likewise impair the quality of the carbon black thus produced (high undecomposed hydrocarbon content). The quenching procedure carried out beyond the reaction threshold leads to burning out of carbon black, which, in turn, reduces its yield and increases its roughness coefficient.

In accordance with the invention, quenching is effected at the rate of about $10^5$ to $10^6$ degrees per sec. The quenching time varies depending on the type of product (carbon black) and is within the range of from $10^{-3}$ to $10^{-2}$ sec.

The reaction mixture cooled to a temperature ranging from 200° to 700° C is then passed to collection means (cyclones and filters) wherein the dispersed product (carbon black) is deposited and recovered by any conventional means.

It should be pointed out that the authors of this invention can determine the quality of carbon black produced by the herein-disclosed process, by way of electron-microscopic, chemical and spectroscopic analysis.

EXAMPLE 1

Used as the heat carrier is a plasma-forming gas, viz. propanebutane.

As the hydrocarbon feedstock use is made of green oil (a mixture of high-molecular polycyclic hydrocarbons). The plasmatron is of the electric-arc type, operable on direct current, consuming up to 25 kw, and with uortex stabilized arc discharge.

The heat carrier, propanebutane, heated in the plasmatron I, passes into the reaction chamber 2 in the form of a plasma stream at a flow rate of 5.57 m³/h and at a mass mean temperature of 4,000° K. Water vapor is directly blown into the plasma stream of the heat carrier radially and tangentially in relation to the walls of the reaction chamber 2, in four radial streams at a rate of 4.1 m³/h and in two tangential streams at a rate of 1.38 m³/h. The water vapor temperature is 500° C. After 50 μsec, introduced into this flow is the hydrocarbon feedstock (green oil) in an amount of 2.4 kg/h. After the reaction of hydrocarbon feedstock decomposition into carbon (black) and gaseous by-products, the reaction mixture is quenched with a spray of water to a temperature between 200° and 500° C, and is then fed to a glass-fabric filter, whereat carbon black is separated from the gaseous products. The yield of carbon black constitutes 82 percent by weight of the feedstock.

The obtained carbon black has the following chemical and physical characteristics:

| 1. | Specific geometrical surface m²/g | 220 |
|---|---|---|
| 2. | DBP absorption, ml 100 g | 130 |
| 3. | Specific adsorption surface, m²/g | 230 |
| 4. | $\frac{d_{ms}}{d_{ar}}$ | 113 | where $d_{ms}$ is the surface mean diameter of the carbon black particles, according to electron-microscopic analysis, A°;

$d_{ar}$ is the arithmetic mean diameter of the particles, according to electron-microscopic analysis, A°.

5. Complete absence of pyrolytic carbon, graphite amd lamellar structures.

EXAMPLE 2

The carbon black producing process is the same as in Example 1, except that the flow rate of the heat carrier is 8.2 Nm³/h at a mass mean temperature of 3500° K.

After 55 m/sec, that is the length of time the heat carrier requires to cover the distance of about five diameters of the reaction chamber, introduced into the heat carrier is the hydrocarbon feedstock, green oil, at a rate of 1.5 kg/h.

The carbon black yield constitutes 70 percent by weight of the feedstock.

The obtained carbon black has the following chemical and physical characteristics:

| 1. | Specific geometrical surface, m²/g | 180 |
|---|---|---|
| 2. | DBP adsorption, ml/100g | 180 |
| 3. | Specific adsorption surface, m²/g | 250 |
| 4. | $\frac{d_{ms}}{d_{ar}}$ | 1.26 |

The obtained carbon black contains 27% of carbonaceous material in the form of pyrolytic carbon and graphite whiskers, as well as residues of undecomposed hydrocarbon feestock, and lamellar carbonaceous structures.

EXAMPLE 3

Procedure is the same as in Example 1, except that the flow rate of the heat carrier at a mean mass temperature of 3500° K is 3.5 m³/h. The flow rate of water vapor blown into the heat carrier in radial streams constitutes 1.5 nm³/hr, and that in tangential streams constitutes 0.5 m³/hr. The water vapor temperature is 450° C. After 60 μsec, introduced into the heat carrier is the hydrocarbon feedstock (green oil) at a rate of 1.2 kg/h.

The yield of carbon black is 75 percent by weight of the feedstock.

The obtained carbon black has the following chemical and physical characteristics:

| 1. | Specific geometrical surface, m²/g | 190 |
|---|---|---|
| 2. | Specific adsorption surface, m²/g | 210 |
| 3. | DBP absorption ml/g | 160 |
| 4. | $\frac{d_{ms}}{d_{ar}}$ | 1.19 |

5. There is a complete absence of pyrolytic carbon, graphite and lamellar structures and an insignificant amount of the undecomposed hydrocarbon feedstock.

EXAMPLE 4

The carbon black producing process is the same as in Example I, except that the flow rate of the heat carrier propane-butane is 4 m³/h at a mass mean temperature of 4500° K. The flow rate of the water vapor blown into the heat carrier in radial streams is 2.27 m³/h and that in tangential streams is 0.7 nm³/h. The water vapor temperature is 400° C. After 50 μsec, introduced into the heat carrier is the hydrocarbon feedstock (green oil) at a rate of 1.5 kg/h.

The yield of carbon black is 78 percent by weight of the feedstock. The obtained carbon black has the following chemical and physical characteristics:

| 1. | Specific geometrical surface, m²/g | 190 |
|---|---|---|
| 2. | Specific adsorption surface, m²/g | 200 |

-continued

| | | |
|---|---|---|
| 3. | DBP absorption ml/100 gr | 140 |
| 4. | $\frac{d_{ms}}{d_{ar}}$ | 1.17 |

5. There is complete absence of pyrolytic carbon, graphite and lamellar structures and an insignificant amount of the undecomposed hydrocarbon feedstock.

EXAMPLE 5

The carbon black producing process is the same as in Example I, except that the flow rate of the heat carrier (propane-butane) is 3.8 m³/h at a mass mean temperature of 4,500° K. The flow rate of the water vapor blown into the heat carrier in radial streams is 3 m³/h and that in tangential streams is 1 m³/h. The water vapor temperature is 420° C. After 30 μsec, introduced into the heat carrier is the hydrocarbon feedstock (green oil) at a rate of 1.7 m³/h.

The yield of carbon black is 52 percent by weight of the feedstock. The carbon black obtained has the following chemical and physical characteristics:

| | | |
|---|---|---|
| 1. | Specific geometrical surface, m²/g | 200 |
| 2. | Specific adsorption surface, m²/g | 230 |
| 3. | DBP absorption, ml/100 g | 150 |
| 4. | $\frac{d_{ms}}{d_{ar}}$ | 1.28 |

5. There is a complete absence of pyrolytic carbon, graphite and lamellar structures. The undecomposed feedstock and carbonaceous gaseous products (methane, ethane, acetylene and others) constitute up to 20%.

EXAMPLE 6

The carbon black producing process is the same as in Example I, except that the flow rate of the heat carrier (propane-butane) at a mass mean temperature of 3,000° K is 7.2 m³/h. The flow rate of the water vapor blown into the heat carrier in radial streams is 5.1 m³/h, and that in tangential streams is 1.7 m³/h. The water vapor temperature is 580° C. After 37 μsec, introduced into the heat carrier is the hydrocarbon feedstock (green oil) at a rate of 2.8 m³/h.

The yield of carbon black is 70 percent by weight of the stock.

The carbon black obtained has the following chemical and physical characteristics:

| | | |
|---|---|---|
| 1. | Specific geometrical surface, m²/g | 160 |
| 2. | Specific adsorption surface, m²/g | 180 |
| 3. | DBP absorption ml/100 g | 140 |
| 4. | $\frac{d_{ms}}{d_{ar}}$ | 1.19 |

5. There is a complete absence of pyrolytic carbon, graphite and lamellar structures. The undecomposed feedstock and carbonaceous gaseous products constitute up to 11 percent by weight of the feedstock.

EXAMPLE 7

The carbon black producing process is the same as in Example 1, except that the flow rate of the heat carrier (propane-butane) at a mass mean temperature of 4,000° K, is 5.3 m³/h. The flow rate of the water vapor blown into the heat carrier in radial streams is 3.6 m³/h, and that in tangential streams is 1.25 m³/h. The water vapor temperature is 500° C. After 45 μsec, introduced into the heat carrier is the hydrocarbon feedstock (green oil) at a rate of 2 kg/h. The carbon black yield is 87 percent by weight of the feedstock. The carbon black obtained has the following chemical and physical characteristics:

| | | |
|---|---|---|
| 1. | Specific geometrical surface, m²/g | 200 |
| 2. | Specific adsorption surface, m²/g | 210 |
| 3. | DBP absorption ml/100 g | 150 |
| 4. | $\frac{d_{ms}}{d_{ar}}$ | 11.12 |

5. There is a complete absence of pyrolytic carbon, graphite and lamellar structures.

EXAMPLE 8

The carbon black producing process is the same as in Example I, except that the flow rate of the heat carrier (propane-butane) at a mass mean temperature of 4,000° K is 6.3 m³/h. The flow rate of the water vapor blown into the heat carrier in radial streams is 4.5 m³/h, and that in tangential streams is 1.5 m³/h. The water vapor temperature is 500° C. After 60 μsec, introduced into the heat carrier is the hydrocarbon feedstock (green oil) at a rate of 2.4 kg/h. The carbon black yield is 86 percent by weight of the stock.

The carbon black obtained has the following chemical and physical characteristics:

| | | |
|---|---|---|
| 1. | Specific geometrical surface, m²/g | 190 |
| 2. | Specific adsorption surface, m²/g | 190 |
| 3. | DBP absorption, ml 100 g | 150 |
| 4. | $\frac{d_{ms}}{d_{ar}}$ | 1.12 |

5. There is a complete absence of pyrolytic carbon, graphite and lamellar structures.

EXAMPLE 9

The carbon black producing method is the same as in Example I, except that the flow rate of the heat(propane-butane) carrier at a mass mean temperature of 4,000° K is 5 m³/h. The flow rate of the water vapor blown into the heat carrier in radial streams is 3.75 m³/h, and that in tangential streams is 1.25 m³/h. The water vapor temperature is 470° C. After 51 μsec, introduced into the heat carrier is the hydrocarbon feedstock (thermal cracking oil) which is not premixed with water vapor; the hydrocarbon feedstock feed rate is 2 kg/h.

The carbon black obtained has the following chemical and physical characteristics:

| | | |
|---|---|---|
| 1. | Specific geometrical surface m²/g | 165 |
| 2. | Specific adsorption surface, m²/g | 180 |
| 3. | DBP absorption, ml/100 g | 160 |
| 4. | $\frac{d_{ms}}{d_{ar}}$ | 1.13 |
| 5. | Carbon black surface chemistry: | |
| | (a) Quinone-group content, | 0.312 m.equiv/g |
| | (b) Lactone-group content, | 0.1 m.equiv/g |

EXAMPLE 10

The carbon black producing process is the same as in Example I except that the flow rate of the heat carrier (propane-butane-air) at a mass mean temperature of 4,000° K is 4.3 m³/h. The flow rate of the water vapor blown into the heat carrier in radial streams is 3 m³/h, and that in tangential streams is 1 m³/h. The water vapor temperature is 400° C. After 50 μsec, introduced into the heat carrier is the hydrocarbon feedstock (thermal cracking gas oil) premixed with water vapor, in an amount of 1.5 percent by weight of the feedstock. The water vapor temperature is 470° C. The feed rate of the hydrocarbon feedstock (thermal cracking gas oil) is 1.7 kg/h.

The carbon black obtained has the following chemical and physical characteristics:

| | | |
|---|---|---|
| 1. | Specific geometrical surface, m²/g | 210 |
| 2. | Specific adsorption surface, m²/g | 200 |
| 3. | DBP absorption, ml 100 g | 110 |
| 4. | $\dfrac{d_{ms}}{d_{ar}}$ | 1.15 |
| 5. | Carbon black surface chemistry: | |
| | (a) Quinone-group content, | 0.479 m.equiv/g |
| | (b) Lactone-group content, | 0.17 m.equiv/g |

Example II

The carbon black producing process is the same as in Example I, except that the flow rate of the heat carrier (propane-butane-air) with a mass mean temperature of 3,500° K is 7.2 m³/h. The flow rate of the water vapor blown into the heat carrier in radial streams is 5.2 m³/h, and that in tangential streams is 1.7 m³/h. The water vapor temperature is 500° C. After 50 μsec, introduced into the heat carrier is the hydrocarbon feedstock (thermal cracking oil) premixed with water vapor, in an amount of 2.7 percent by weight of the feedstock. This water vapor has a temperature of 520° C. The hydrocarbon feedstock feed rate is 2.64 kg/h.

The carbon black obtained has the following chemical and physical characteristics:

| | | |
|---|---|---|
| 1. | Specific geometrical surface, m²/g | 140 |
| 2. | Specific adsorption surface, m²/g | 160 |
| 3. | DBP absorption, ml/100 g | 120 |
| 4. | $\dfrac{d_{ms}}{d_{ar}}$ | 1.14 |
| 5. | Carbon black surface chemistry: | |
| 1) | Quinone-group content, | 1.425 m.equiv/g |
| 2) | Lactone-group content, | 0.365 m.equiv/g |

5. There is a complete absence of pyrolytic carbon, graphite and lamellar structures.

EXAMPLE 12

The carbon black producing process is the same as in Example I except that the flow rate of the heat carrier (propane-butane) at a mass mean temperature of 4,000° K is 3.4 m³/h. The flow rate of the water vapor blown into the heat carrier in radial streams is 2.4 m³/h, and that in tangential streams is 0.8 m³/h. The water vapor temperature is 430° C.

Water vapor saturation of the plasma-forming heat carrier is effected at the initial portion of the plasma nucleus. After 55 μsec. introduced into the heat carrier is the hydrocarbon feedstock (green oil) at a rate of 1.3 kg/h.

The carbon black obtained has the following chemical and physical characteristics:

| | | |
|---|---|---|
| 1. | Specific geometrical surface, m²/g | 160 |
| 2. | Specific adsorption surface, m²/g | 170 |
| 3. | DBP absorption, ml/g | 110 |
| 4. | $\dfrac{d_{ms}}{d_{ar}}$ | 1.16 |

5. There is a complete absence of pyrolytic carbon, graphite and lamellar structures.
6. Thermal efficiency of the process is 45%.

EXAMPLE 13

Carbon black is produced as in Example 1, except that the flow rate of the heat carrier (propane-butane) at a mass mean temperature of 4,500° K is 4 m³/h.

The flow rate of the water vapor blown into the heat carrier in radial streams constitutes 3 m³/h, and that in tangential streams is 1 m³/h.

The water vapor temperature is 400° C. The saturation of the plasma heat carrier with water vapor is effected by introducing the latter into the end portion of the plasma nucleus.

After 50 μsec, introduced into the heat carrier is the hydrocarbon feedstock (green oil) at a rate of 1.5 kg/h. The carbon black obtained has the following chemical and physical characteristics:

| | | |
|---|---|---|
| 1. | Specific geometrical surface, m²g | 140 |
| 2. | Specific adsorption surface, m²/g | 150 |
| 3. | DBP absorption, ml/100 g | 120 |
| 4. | $\dfrac{d_{ms}}{d_{ar}}$ | 1.15 |

5. There is a complete absence of pyrolytic carbon, graphite and lamellar structures.
6. Thermal efficiency of the process is 41%.

EXAMPLE 14

The carbon black producing process is the same as in Example 1 except that the flow rate of the heat carrier (propane-butane) at a mass mean temperature of 3,100° K is 5.2 m³/h. The flow rate of the water vapor blown into the heat carrier in radial streams is 3.7 m³/h, and that in tangential streams is 1.3 m³/h. The water vapor temperature is 430° C. The water vapor saturation of the heat carrier is effected by introducing water vapor into the reaction zone beyond the plasma nucleus. After 55 μsec, introduced into the heat carrier is the hydrocarbon feedstock (green oil) at a rate of 2 kg/h. The carbon black obtained has the following chemical and physical characteristics:

| | | |
|---|---|---|
| 1. | Specific geometrical surface, m²/g | 110 |
| 2. | Specific adsorption surface, m²/g | 100 |
| 3. | DBP absorption, ml 100 g | 140 |
| 4. | $\dfrac{d_{ms}}{d_{ar}}$ | 1.14 |

5. There is a complete absence of pyrolytic carbon, graphite and lamellar structures.
6. Thermal efficiency of the process is 33%.

EXAMPLE 15

The carbon black producing method is the same as in Example I, except that the flow rate of the heat carrier at a mass mean temperature of 3,500° K is 3.7 m³/h. The flow rate of the water vapor blown into the heat carrier in radial streams is 3 m³/h, and that in tangential streams is 1 m³/h. The water vapor temperature is 500° C.

After 47 μsec, introduced into the heat carrier is the hydrocarbon feedstock (green oil) at a rate of 1.5 kg/h. The carbon black obtained has the following chemical and physical characteristics:

| 1. | Specific geometrical surface, m²/g | 120 |
|---|---|---|
| 2. | Specific adsorption surface, m²/g | 120 |
| 3. | DBP absorption, ml/100 g | 100 |
| 4. | $\dfrac{d_{ms}}{d_{ar}}$ | 1.13 |

5. There is a complete absence of pyrolytic carbon, graphite and lamellar structures.
6. Optical density of the gasoline extract is 0.0015, i.e., within the rating.

EXAMPLE 16

The carbon black producing process is the same as in Example I, except that the flow rate of the heat carrier (propane-butane) at a mass mean temperature of 3,500° K is 4.2 m³/h.

The flow rate of the water vapor blown into the heat carrier in radial streams is 2.5 m³/hr, and that in tangential streams is 1.5 m³/h. The water vapor temperature is 460° C.

After 45 μsec, introduced into the heat carrier is the hydrocarbon feedstock (green oil), at a rate of 1.6 kg/h. The carbon black obtained has the following chemical and physical characteristics:

| 1. | Specific geometrical surface, m²/g | 120 |
|---|---|---|
| 2. | Specific adsorption surface, m²/g | 120 |
| 3. | DBP absorption, ml/100 g | 140 |
| 4. | $\dfrac{d_{ms}}{d_{ar}}$ | 1.18 |

5. There is a complete absence of pyrolytic carbon, graphite and lamellar structures.
6. Optical density of the gasoline extract is 0.52.

EXAMPLE 17

The carbon black producing process is the same as in Example I, except that the flow rate of the heat carrier (propane-butane) at a mass mean temperature of 3,700° K is 4 m³/h. The flow rate of the water vapor blown into the heat carrier in radial streams is 2 m³/h, and that in tangential streams is 2 m³/h. The water vapor temperature is 450° C. After 50 μsec, introduced into the heat carrier is the hydrocarbon feedstock (green oil) at a rate of 1.6 kg/h.

The carbon black obtained has the following chemical and physical characteristics:

| 1. | Specific geometrical surface, m²/g | 100 |
|---|---|---|
| 2. | Specific adsorption surface, m²/g | 120 |
| 3. | DBP absorption, ml/100 g | 140 |
| 4. | $\dfrac{d_{ms}}{d_{ar}}$ | 1.21 |

5. There is a complete absence of pyrolytic carbon, graphite and lamellar structures.
6. Optical density of the benzine gasoline extract is 0.63.

EXAMPLE 18

The carbon black producing method is the same as in Example I, except that the flow rate of the heat carrier (propane-butane) at a mass mean temperature of 3.700° K is 4 m³/h. The flow rate of the water vapor blown into the heat carrier in radial streams is 1.5 m³/h, and that in tangential streams is 2.5 m³/h. The water vapor temperature is 450° C. After 50 μsec, introduced into the heat carrier is the hydrocarbon feedstock (green oil) at a rate of 1.6 kg/h.

The carbon black obtained has the following chemical and physical characteristics:

| 1. | Specific geometrical surface, m²/g | 100 |
|---|---|---|
| 2. | Specific adsorption surface, m²/g | 130 |
| 3. | DBP absorption ml/100 g | 140 |
| 4. | $\dfrac{d_{ms}}{d_{ar}}$ | 1.25 |

5. There is complete absence of pyrolytic carbon, graphite and lamellar structures.
6. Optical density of the benzine gasoline extract is 0.84.

EXAMPLE 19

The carbon black producing process is the same as in Example I, except that the flow rate of the heat carrier (propane-butane) at a mass mean temperature of 4,000° K is 5.2 m³/h. The flow rate of the water vapor blown into the heat carrier in radial streams is 3.9 m³/h, and that in tangential streams is 1.2 m³/h. Water vapor temperature is 370° C. After 48 μsec the hydrocarbon feedstock (green oil) is fed into the heat carrier, the flow rate of the feedstock being 2 kg/h. The carbon black obtained has the following chemical and physical characteristics:

| 1. | Specific geometrical surface, m²/g | 130 |
|---|---|---|
| 2. | Specific adsorption surface, m²/g | 160 |
| 3. | DBP absorption ml/100 g | 110 |
| 4. | $\dfrac{d_{ms}}{d_{ar}}$ | 1.26 |

5. There is an insignificant amount of carbon black lamellar structures (2%).
6. Optical density of the gasoline extract is 0.37.
7. After a 30-minute operating cycle, the walls of the reaction chamber were destroyed.

What is claimed is:
1. A plasmatron process for the production of carbon black comprising:
   (a) introducing a gaseous heat carrier in the form of a plasma stream into a reaction chamber at a temperature of 2000° to 5000° K;
   (b) contacting the plasma stream with water vapor prior to contacting with a feedstock, said water vapor being introduced radially and tangentially with respect to the walls of the reaction chamber wherein the radial and tangential amounts of water vapor vary in a ratio of at least 3:1 respectively;
   (c) contacting the plasma stream in the reaction chamber with a hydrocarbon feedstock saturated with water vapor, introduced at a distance of not less than 5 diameters of the reaction chamber from the point of introduction of the water vapor into said plasma stream;
   (d) cooling the reaction products resulting from the thermal decomposition of the feedstock to a temperature of about 200° to 700° C; and
   (e) recovering the product.
2. The process of claim 1 wherein the feedstock is premixed with water vapor.
3. The process of claim 1 wherein the plasma stream forming gases are selected from the group consisting of hydrocarbons or mixtures thereof with air, inert gases, air, off gases of the carbon black production separated from carbon black, and mixtures thereof.

* * * * *